United States Patent [19]
Tomimori

[11] Patent Number: 5,987,104
[45] Date of Patent: Nov. 16, 1999

[54] TELEPHONE WITH FUNCTION OF CREATING COMPOSITE PORTRAIT

[75] Inventor: Takeshi Tomimori, Tokyo, Japan

[73] Assignee: Mitsubishi Denki Kabushiki Kaisha, Tokyo, Japan

[21] Appl. No.: 09/157,258

[22] Filed: Sep. 18, 1998

[30] Foreign Application Priority Data

Jan. 23, 1998 [JP] Japan .................. 10-011843

[51] Int. Cl.⁶ .................................................. H04M 11/00
[52] U.S. Cl. .................... 379/93.23; 348/14; 379/93.17
[58] Field of Search .................. 348/14, 15; 379/93.17, 379/93.23, 110.01; 455/556, 566, 186.1; 345/435, 330

[56] References Cited

U.S. PATENT DOCUMENTS

| | | | |
|---|---|---|---|
| 5,588,096 | 12/1996 | Sato et al. | 345/435 |
| 5,808,624 | 9/1998 | Ikedo et al. | 345/435 |

FOREIGN PATENT DOCUMENTS

| | | | |
|---|---|---|---|
| 0212056 | 8/1989 | Japan | 379/53 |
| 478877 | 7/1992 | Japan | |
| 983630 | 3/1997 | Japan | |

*Primary Examiner*—Curtis A. Kuntz
*Assistant Examiner*—Melur Ramakrishnaiah
*Attorney, Agent, or Firm*—Rothwell, Figg, Ernst & Kurz

[57] ABSTRACT

A telephone capable of facilitating identification of a party by intuition and improving operability by providing a portrait representative of an image of the party. The telephone includes a portrait montage portion for combining portrait elements into a composite portrait associated with a called party; a recording portion for recording in a memory table the composite portrait in conjunction with its name and telephone number; a selectively read portion for selectively reading from the memory table the composite portrait, name and telephone number; a display unit for displaying, when forming the composite portrait by the portrait image montage portion, the portrait elements and a composite portrait generated by combining them, and for displaying the composite portrait, its name and telephone number, which are read by the selectively read portion; and an automatic dialing portion for dialing the telephone number which is read by the selectively read portion and displayed on the display unit.

14 Claims, 13 Drawing Sheets

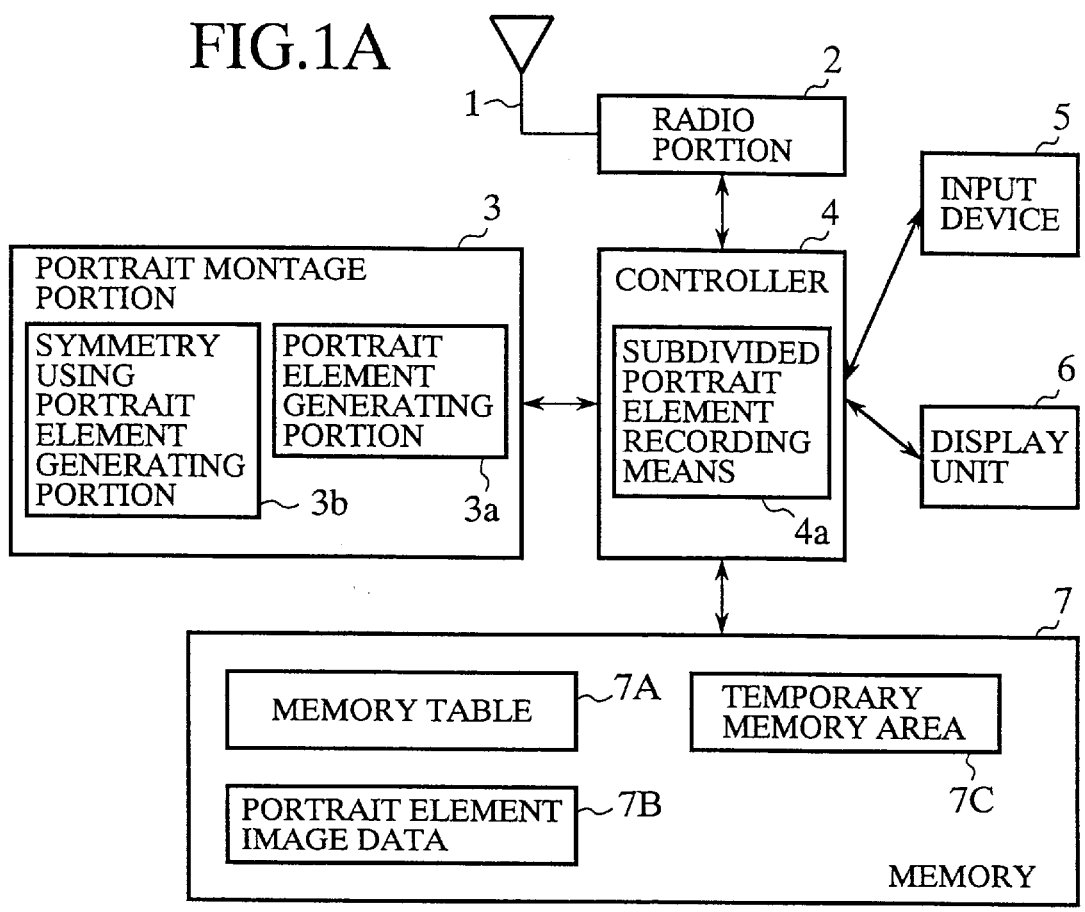
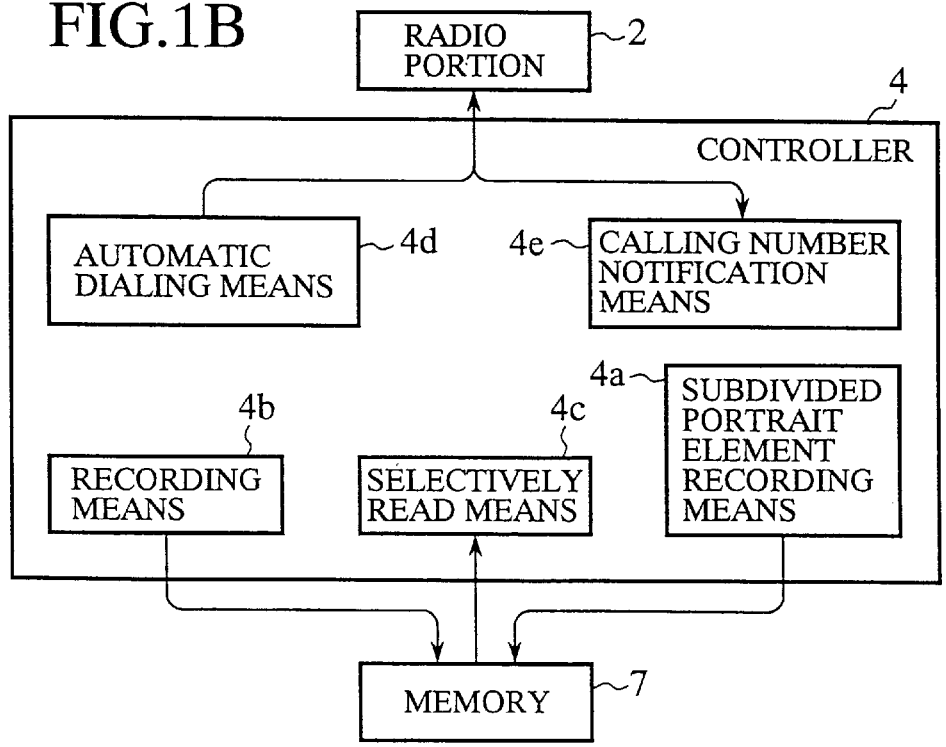

| ENTRY No. | 002 |
|---|---|
| NAME | Masashi Inoue |
| PHONE No. | 093-555-6666 |
| PORTRAIT ELEMENT No. : HAIR STYLE | 7 |
| PORTRAIT ELEMENT No. : EYES | 2 |
| PORTRAIT ELEMENT No. : MOUTH & NOSE | 3 |
| PORTRAIT ELEMENT No. : CONTOUR | 4 |
| COMPOSITE PORTRAIT | |

| ENTRY No. | PHONE No. | NAME | PORTRAIT ELEMENT No. | | | |
|---|---|---|---|---|---|---|
| | | | HAIR | EYES | MOUTH & NOSE | CONTOUR |
| 0 | 03-1111-2222 | Hanako Ito | 22 | 5 | 10 | 1 |
| 1 | 06-333-4444 | Taro Sato | 3 | 5 | 2 | 15 |
| 2 | 093-555-6666 | Masashi Inoue | 7 | 2 | 3 | 4 |
| 3 | 010-77-88888 | Kyoko Yoshida | 31 | 18 | 12 | 11 |
| ---- | ---- | ---- | ---- | ---- | ---- | ---- |

FIG.4
| | | 1 | 2 | 3 | 4 | 5 | ..... |
|---|---|---|---|---|---|---|---|
| (a) | ENTRY No. OF HAIR STYLE | | | | | | ..... |
| | IMAGE DATA |  |  |  |  |  | ..... |
| (b) | ENTRY No. OF EYES | 1 | 2 | 3 | 4 | 5 | ..... |
| | IMAGE DATA |  | 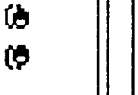 | 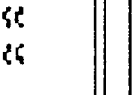 | 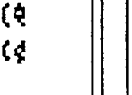 |  | ..... |
| (c) | ENTRY No. OF MOUTH & NOSE | 1 | 2 | 3 | 4 | 5 | ..... |
| | IMAGE DATA | 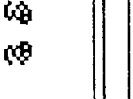 | 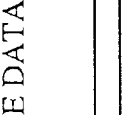 | 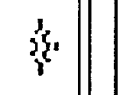 |  | 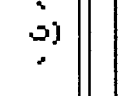 | ..... |
| (d) | ENTRY No. OF FACIAL CONTOUR | 1 | 2 | 3 | 4 | 5 | ..... |
| | IMAGE DATA |  | 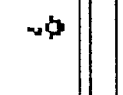 | 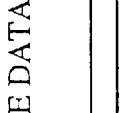 |  |  | ..... |
7B

FIG.12
| | | 1 | 2 | 3 | 4 | 5 | ---- |
|---|---|---|---|---|---|---|---|
| (a) | ENTRY No. OF HAIR STYLE | | | | | | ---- |
| | IMAGE DATA | 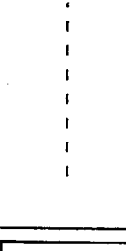 |  |  |  |  | ---- |
| (b) | ENTRY No. OF EYES | | | | | | ---- |
| | IMAGE DATA | 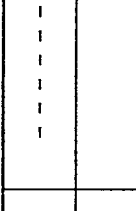 | 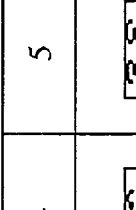 | 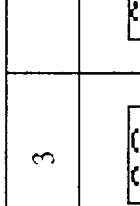 | 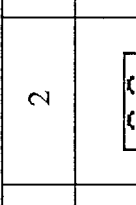 | 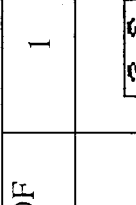 | ---- |
| (c) | ENTRY No. OF MOUTH & NOSE | | | | | | ---- |
| | IMAGE DATA | 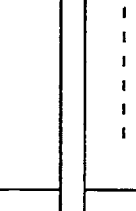 | 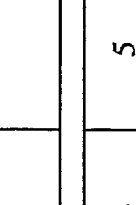 | 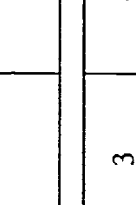 | 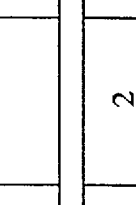 | 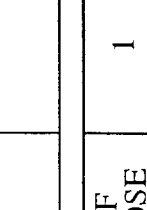 | ---- |
| (d) | ENTRY No. OF FACIAL CONTOUR | | | | | | ---- |
| | IMAGE DATA |  | 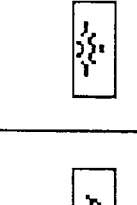 | 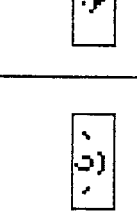 | 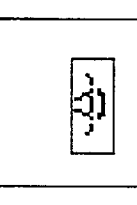 | 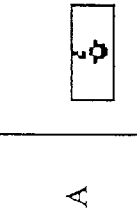 | ---- |
7B

| ELEMENT | X COORDINATE | Y COORDINATE |
|---|---|---|
| HAIR STYLE | 1 | 1 |
| EYES | 7 | 7 |
| MOUTH / NOSE | 10 | 18 |
| CONTOUR | 3 | 16 |

7D

| | 1 | 2 | 3 | 4 | 5 | 6 | 7 |
|---|---|---|---|---|---|---|---|
| IMAGE DATA | | | | | | | - - - - |

FIG.17
| ELEMENT NUMBER OF HAIR STYLE | TOP LEFT | TOP RIGHT | BOTTOM LEFT | BOTTOM RIGHT |
|---|---|---|---|---|
| 1 | 1 | 2 | 3 | 4 |
| 2 | 1 | 2 | 5 | 6 |
| - - - - - | - - - - - | - - - - - | - - - - - | - - - - - |
7E
FIG.18
HAIR STYLE IMAGE OF ELEMENT No.1 : 
HAIR STYLE IMAGE OF ELEMENT No.2 : 
FIG.19
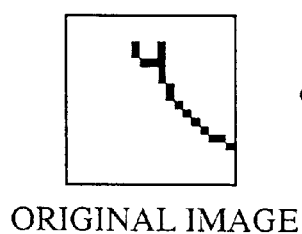  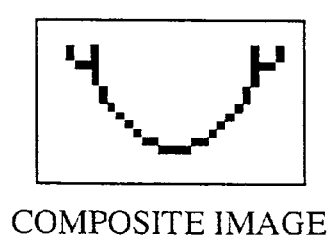
ORIGINAL IMAGE    COMPOSITE IMAGE

|  | FIRST | SECOND | THIRD |
|---|---|---|---|
| ENTRY No.1 | ☺ ☻ | ▽ ▽ | ◡ ◡ |
| ENTRY No.2 | - - - - - - | - - - - - - | - - - - - - |

TELEPHONE WITH FUNCTION OF CREATING COMPOSITE PORTRAIT

BACKGROUND OF THE INVENTION

1. Field of the Invention

The present invention relates to a telephone, and more particularly to a telephone set that can store telephone numbers in connection with names, and place automatic dialing in accordance with a retrieved telephone number.

2. Description of Related Art

Recently, versatile telephones have been wide-spreading which include a telephone-directory-like table for storing telephone numbers in conjunction with names, conduct table searches based on names, and make automatic dialing using retrieved telephone numbers, and these functions become essential for mobile terminals.

To make effective use of these functions, it is important that the retrieval can be achieved easily. In view of this, telephones are developed with such a function that enables users to enter, besides names and telephone numbers, icons, portraits or graphics representative of persons identified by their names, and that displays them during the retrieval to provide visual help, thereby making it possible even for illiterate children to conduct the retrieval.

Telephones with such a function are disclosed, for example, in Japanese utility model application laid-open No. 4-78877/1992, and Japanese patent application laid-open No. 9-83630/1997. The techniques disclosed can store and display pictures or portraits to help users.

The conventional telephones with such an arrangement, particularly current-day downsized mobile terminals, have a problem in that they cannot store a large number image data such as pictures or portraits because they demand very large storage capacity.

In addition, even if the conventional telephones can store pictures or portraits as the image data, they have another problem in that it is difficult for users to search desired ones from among many stored pictures or portraits. This is because such telephones, and mobile terminals in particular, have a small display and keypad, and hence it is difficult for users to discriminate details of an image on the display, which makes correct selection impossible and key operation difficult.

SUMMARY OF THE INVENTION

The present invention is implemented to solve the foregoing problems. It is therefore an object of the present invention to provide a telephone that allows users to draw and enter called parties' portraits the users consider optimal by selecting elements such as their hair style, eyes, nose, mouth or contour, and thus enables the users to make intuitive identification of called parties based on their portraits, thereby improving its operability.

Another object of the present invention is to provide a telephone capable of reducing an amount of image data of the portraits by storing data in the form of their individual elements.

BRIEF DESCRIPTION OF THE DRAWINGS

FIG. 1A is a block diagram showing a configuration an embodiment 1 of a telephone in accordance with the present invention;

FIG. 1B is a functional block diagram showing a major portion of a controller 4 of the embodiment 1 as shown in FIG. 1A;

FIG. 3 is a memory table cross-referring recorded numbers, telephone numbers, names and element numbers of their portraits in the embodiment 1;

FIG. 4 is a schematic illustration showing portrait element image data of the embodiment 1, stored in terms of each element such as a hair style, eyes, a mouth, and a facial contour in connection with recorded numbers;

FIG. 12 is an schematic illustration showing portrait element image data of an embodiment 3 of the telephone in accordance with the present invention, which are stored in terms of each portrait element such as a hair style, eyes, a mouth, and a facial contour;

FIG. 17 is a schematic diagram showing a subdivided portrait element memory table in the embodiment 5;

FIG. 18 is a schematic illustration showing images of the hair style portrait elements generated by combining images of the subdivided portrait elements in the embodiment 5;

FIG. 19 is a schematic illustration showing portrait element image data used in an embodiment 6 of the telephone in accordance with the present invention;

DETAILED DESCRIPTION OF THE PREFERRED EMBODIMENTS

Figures 2, 5:
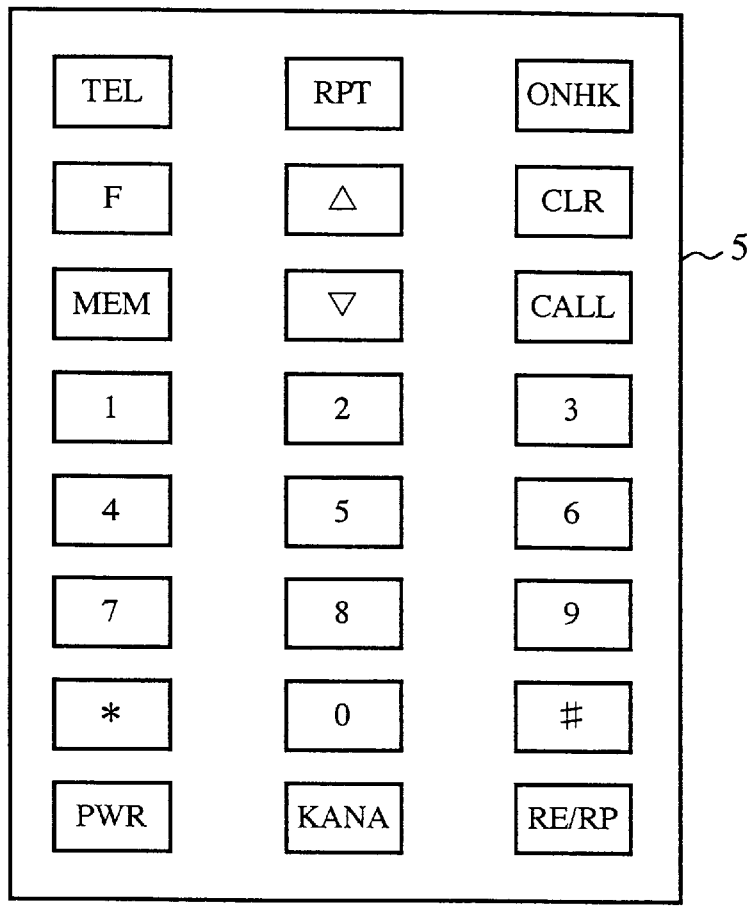
FIG. 2 is a diagram showing the key types and key array of an input device of the embodiment 1.
FIG. 5 is a schematic illustration showing a temporary memory for storing a selected telephone number and a portrait for the time being while recording and retrieving them in the embodiment 1.

The invention will now be described with reference to the accompanying drawings.

EMBODIMENT 1

FIG. 1A is a block diagram showing an embodiment 1 of a telephone in accordance with the present invention. In the following description, the telephone is assumed to be a mobile terminal. In FIG. 1A, the reference numeral 1 designates an antenna; 2 designates a radio portion; 3 designates a portrait montage portion for combining portrait elements into a portrait image in accordance with portrait element numbers selected by a user or recorded in advance; and 4 designates a controller such as a CPU.

FIG. 1B is a block diagram showing a major portion of the controller 4. In FIG. 1B, the reference numeral 4b designates a recording means for recording in a memory table 7A a composite portrait the portrait montage portion 3 generates in conjunction with its name and telephone number; 4c designates a selectively read means for selectively reading from the memory table 7A the composite portrait, name and telephone number; and 4d designates an automatic dialing means for dialing the telephone number read by the selectively read means 4c. The reference numeral 4e designates a calling number notification means for searching, when an incoming call arrives, the memory table 7A for a telephone number provided by a calling number identification presentation of the incoming call, and for having a display unit 6 display, when the telephone number is found in the memory table, the telephone number, a name and a portrait associated with the telephone number to enable identification of a calling party originating the incoming call. The reference numeral 4a designates a subdivided portrait element recording means which will be described later in an embodiment 5. The controller 4 has, besides the foregoing functional blocks, functions for controlling an input device 5, the display unit 6 and radio portion 2.

Returning to FIG. 1A, the reference numeral 5 designates an input device (keypad) for carrying out a call or for recording a portrait of a called party by selecting portrait element numbers. FIG. 2 is a plan view showing key types and a key arrangement of the input device 5.

In FIG. 1A, the reference numeral 6 designates the display unit for displaying a telephone number, name and portrait; 7 designates a memory; and 7A designates a memory table for storing entry numbers, telephone numbers, names and portrait element numbers, which are linked with each other as shown in FIG. 3. The reference numeral 7B designates portrait element image data stored in terms of individual elements for generating a portrait, an example of which is shown in FIG. 4 where image data are stored in terms of the individual elements such as hair styles, eyes, mouths and facial contours in conjunction with entry numbers. The reference numeral 7C designates a temporary memory for temporarily storing a telephone number and portrait that are selected during recording or retrieving them.

Next, the operation of the present embodiment 1 will be described.

Beginning from a recording process of a portrait, a calling process based on the retrieval of a recorded portrait and a called process when an incoming call takes place will be described in this order. These processes are carried out using the input device 5 with the key types and key arrangement as shown in FIG. 2.

(1) Portrait Recording

Figure 6:
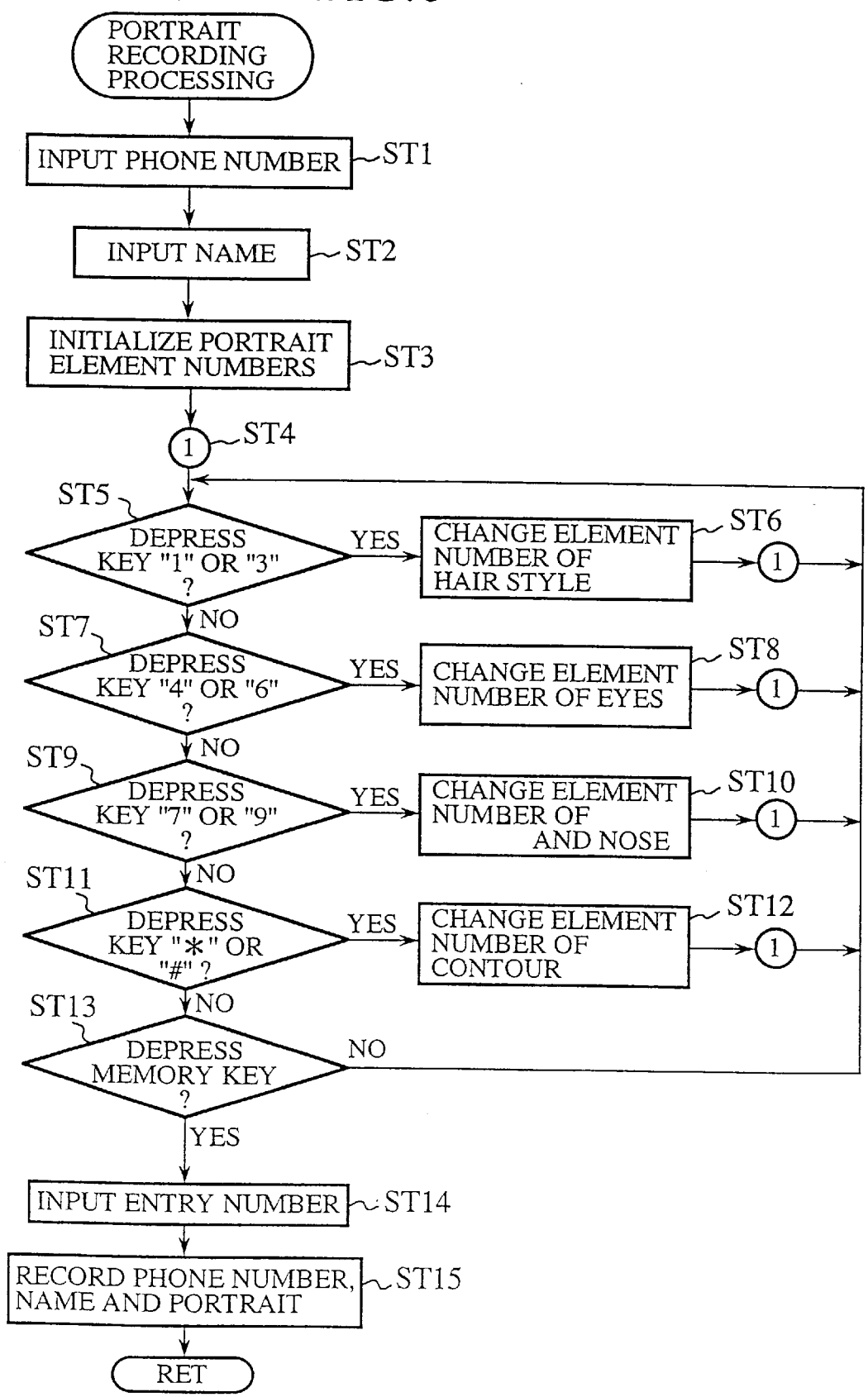
FIG. 6 is a flowchart illustrating a recording operation of a portrait in the embodiment 1.
Figure 7:
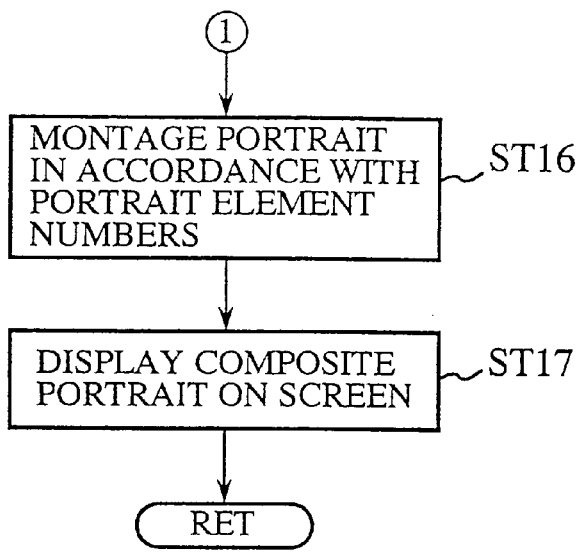
FIG. 7 is a flowchart illustrating the recording operation of portrait in the embodiment 1.

FIGS. 6 and 7 are flowcharts illustrating a portrait recording procedure.

A telephone number and its associated name entered through the input device 5 are temporarily stored in the temporary memory 7C through the controller 4 at steps ST1 and ST2. Upon completing the entry of the telephone number and name, initial values are set in the portrait element numbers in the temporary memory 7C at step ST3, and the portrait montage portion 3 montages the portrait in accordance with the initial values. The portrait montage portion 3 combines into a composite portrait the portrait element image data 7B corresponding to the initial values of the portrait element numbers, and the controller 4 stores the image data of the composite portrait in the temporary memory 7C, and displays it on the display unit 6 at steps ST16 and ST17.

Figure 8:
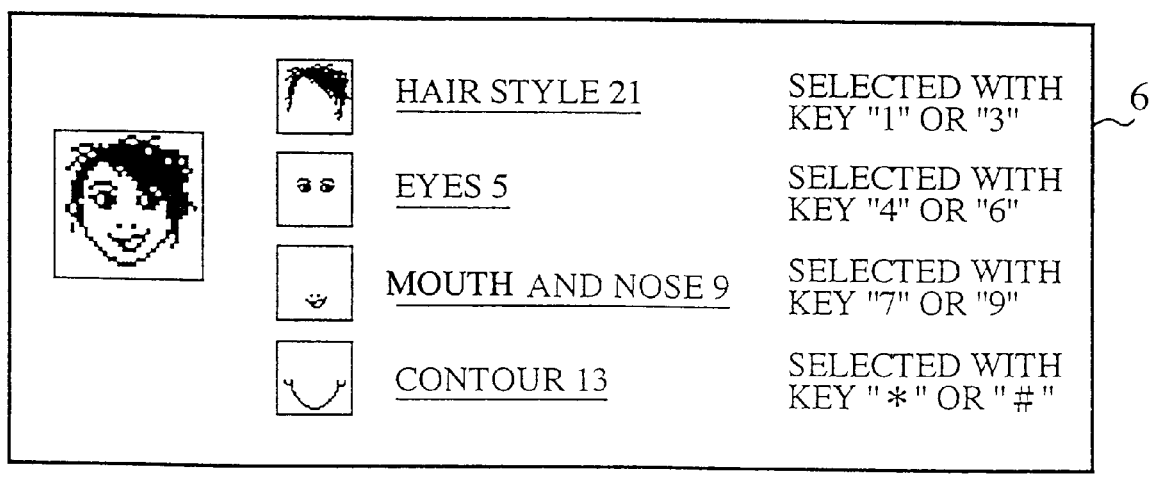
FIG. 8 is a schematic illustration showing a portrait and its elements such as the hair style, eyes, mouth and facial contour displayed on a display unit of the embodiment 1 when combining them into the portrait.

For example, if the entire initial values of the portrait element numbers are "1", the portrait montage portion 3 combines into the composite portrait the elements of the hair style, eyes, mouth and nose, and facial contour corresponding to "1" in the portrait element image data 7B as shown in FIG. 4 at step ST16. The controller 4 stores the composite image data in the temporary memory 7C, and displays it on the display unit 6 during the portrait display period at step ST17. Thus, the portrait based on the initial values of the portrait element numbers is displayed on the display unit 6 as shown in FIG. 8 during the portrait recording period.

Next, the user selects desired portrait elements using keys of the input device 5. First, the user can change the portrait element of the hair style by operating one of the keys "1" and "3" shown in FIG. 2. The key "3" has a function to increment by one the portrait element number of the hair style, whereas the key "1" has a function to decrement it by one. Second, the user can change the portrait element of the eyes by operating one of the keys "4" and "6", which have similar functions to the keys "1" and "3". Third, the user can change the portrait element of the mouth and nose by operating one of the keys "7" and "9", which have similar functions to the keys "1" and "3". Finally, the user can change the portrait element of the facial contour by operating one of the keys "*" and "#".

In response to such user's request to change any of the portrait elements by the key operation of the input device 5, the controller 4 changes the portrait element numbers in the temporary memory 7C. The portrait montage portion 3 carries out the portrait montage processing again in accordance with the selected portrait element numbers, and the controller 4 stores the composite portrait in the temporary memory 7C and displays it on the display unit 6.

For example, when the portrait element number of the hair style is 20, that of eyes is 5, that of mouth and nose is 9, and that of the-facial contour is 13, the depression of the key "3" of the input device 5 will increment the portrait element number of the hair style in the temporary memory 7C by one to 21 at steps ST5 and ST6.

Subsequently, the portrait montage portion 3 montages a portrait in accordance with the portrait element numbers in the temporary memory 7C at step ST16, and the controller 4 stores it in the temporary memory 7C and displays it on the display unit 6 at step ST17. FIG. 8 shows an example of the portrait displayed in this case. Thus, every time such changes in the portrait element numbers occur, the composite portrait generated in accordance with the portrait element numbers the user selected is displayed on the display unit 6 without delay.

Thus, once the composite portrait the user wishes to record has been completed through the foregoing selection operation, the user depresses the memory key "Mem" of the input device 5 at step ST13 to indicate decision. Then, in response to the input of its entry number through the key operation on the input device 5 at step ST14, the controller 4 stores at step ST15 the entry number, telephone number, name and portrait element numbers, which are stored in the temporary memory 7C, in the memory table 7A as one of the entries of the memory dialing table as shown in FIG. 3.

In the foregoing processing, steps ST1–ST17 are controlled and executed by the recording means 4b.

(2) Retrieval and Dialing in Memory Dialing Process.

Figure 9:
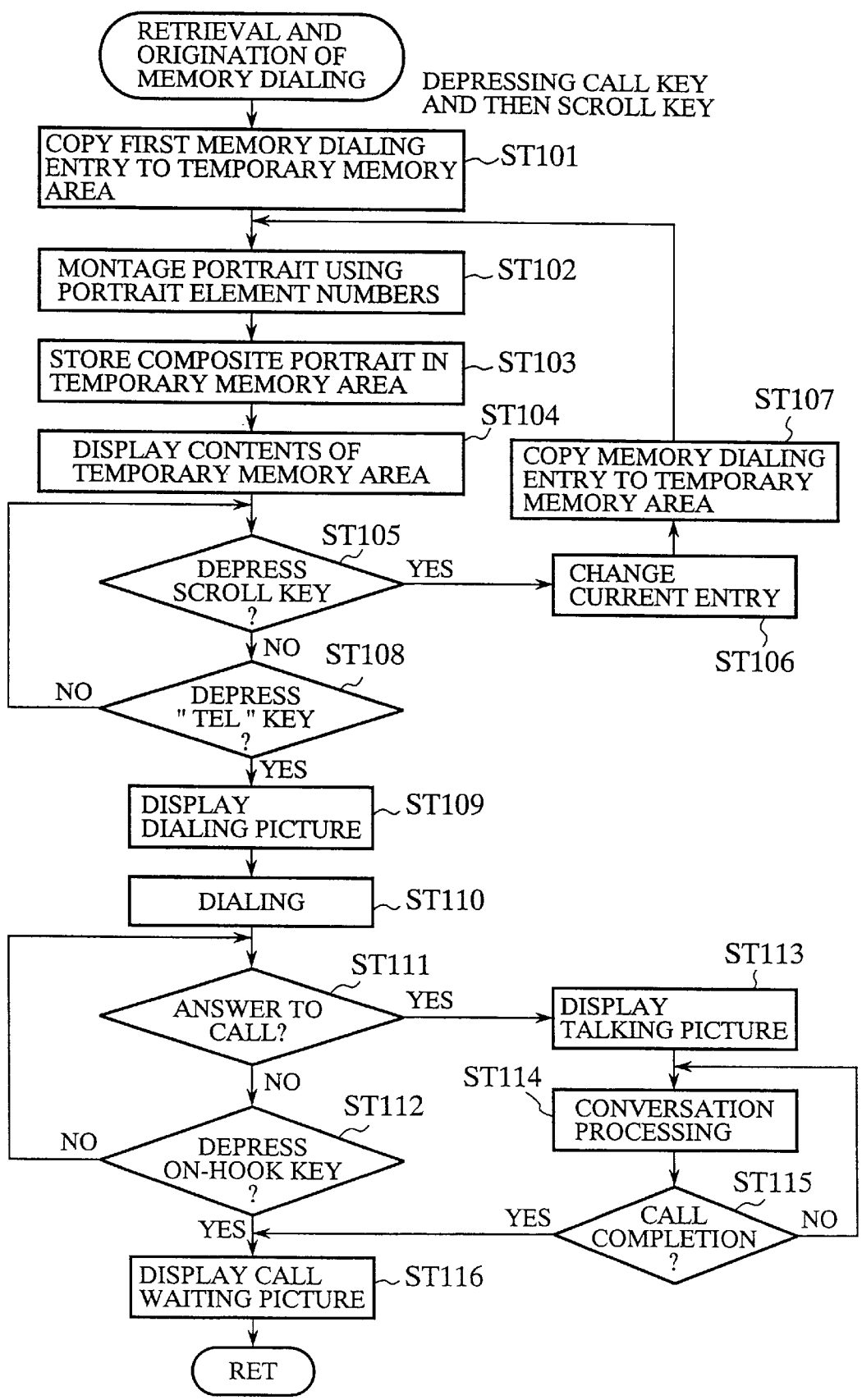
FIG. 9 is a flowchart illustrating a retrieval and call originating operation in memory dialing in the embodiment 1.

FIG. 9 is a flowchart illustrating a retrieval and dialing procedure in memory dialing process. A depression of the call key "Call" of the input device 5 followed by that of the scroll key "∇Δ" starts the retrieval operation in ascending order of the entry numbers of the memory dialing table as shown in FIG. 3. First, the controller 4 copies into the temporary memory 7C the entry with the smallest entry number from the memory dialing table in the memory table 7A at step ST101. Subsequently, the portrait montage portion 3 generates the portrait in accordance with the portrait element numbers in the temporary memory 7C at step ST102 as in the recording process. The controller 4 stores the generated portrait in the temporary memory 7C at step ST103, and then displays on the display unit 6 the contents in the temporary memory 7C during the memory dialing retrieval process in accordance with the portrait element numbers at step ST104, an example of which is shown in FIG. 10.

Figure 11:
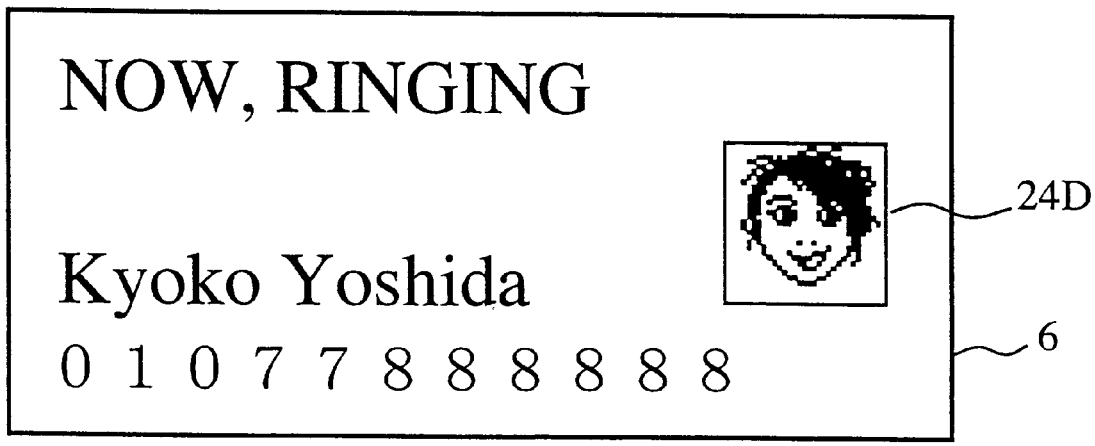
FIG. 11 is a schematic illustration showing the screen of the display unit indicating "Now, ringing" in the display of FIG. 10.

When the user depresses the scroll key "∇Δ" for retrieval, the controller 4 copies from the memory table 7A into the temporary memory 7C the next or previous entry that is adjacent in the memory dialing table to the current entry stored in the temporary memory 7C at steps ST106 and ST107, generates and stores a portrait through the foregoing steps ST102, ST103 and ST104, and displays it on the display unit 6. When the user depresses the call originating key "Tel" of the input device 5 during the display of a desired memory dialing, the controller 4 displays on the display unit 6 the "ringing" picture including the portrait as shown in FIG. 11 at step ST109, and dials the telephone number stored in the temporary memory 7C at step ST110. If the called party answers the call, the controller 4 changes the "ringing" display of FIG. 11 into "talking" display, and carries out conversation processing at steps ST111 and ST112. By thus displaying the portrait of the called party during the ringing and talking can add a sense of realism of talking with the party.

Figure 10:
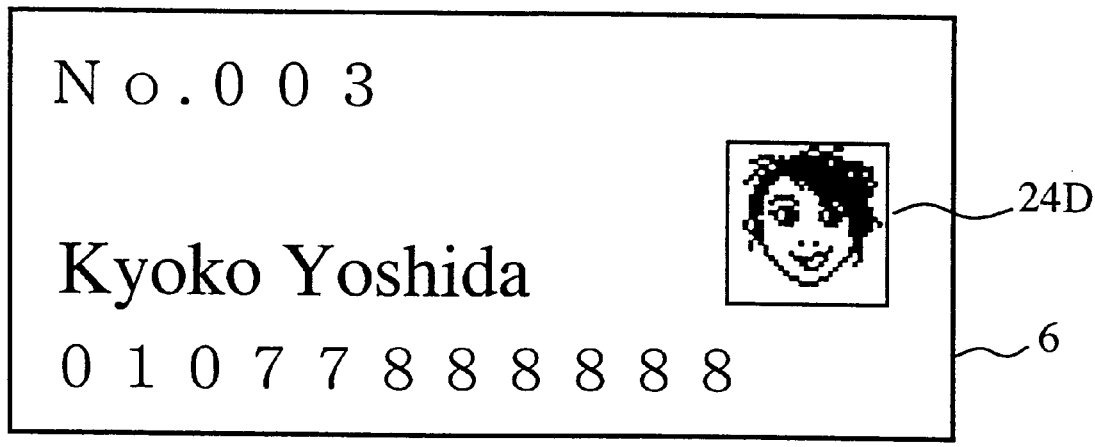
FIG. 10 is a schematic illustration showing retrieved contents displayed on the display unit during memory dialing retrieval in the embodiment 1.

When it is found that the conversation completes at steps ST114 and ST115, or the called party does not answer and the user depresses the on-hook key "Onhk" at step ST112, the controller 4 displays on the display unit 6 the original call waiting picture as shown in FIG. 10 at step ST116.

In the foregoing processings, steps ST104, ST105 and ST108 are executed by the selectively read means 4c, and step ST110 is executed by the automatic dialing means 4d.

(3) Incoming Call Process (with calling number identification presentation).

In this case, the controller 4 searches the memory dialing table in the memory table 7A using the calling number as a key. If the corresponding telephone number is found, it copies into the temporary memory 7C the telephone number, the name corresponding to the telephone number and the portrait element numbers, from which the portrait montage portion 3 generates the portrait of the calling party. The controller 4 stores the portrait in the temporary memory 7C, and displays it on the display unit 6. The display unit 6 displays a picture as shown in FIG. 11 which includes a message "Incoming Call" instead of the message "Now, ringing", and the name, telephone number and portrait stored in the temporary memory 7C. This enables the user to identify the party of the incoming call by intuition from the portrait as well as the name and telephone number, and to respond to the party positively and quickly without making a mistake. The incoming call processing is mainly executed by the calling number notification means 4e as shown in FIG. 1B.

According to the present embodiment 1, since the elements for producing the portrait, such as hair styles, eyes, mouths and facial contours are stored in advance as the image data, the amount of the image data can be reduced. This makes possible to reduce the memory capacity for storing the image data. In addition, since the portrait is generated by combining the elements, the present embodiment 1 has an advantage of being able to implement a telephone that can speed up the combining processing of the portrait elements and the display processing on the display unit 6.

Furthermore, since the party can be searched by means of the portrait, the party can be identified by intuition. This offers an advantage of being able to implement the telephone that can search for the party easily and quickly.

Moreover, since the user can carry on a conversation with imaging the party from the portrait during the call, the present embodiment 1 has an advantage of being able to implement the telephone that can add the realism of talking with the party.

Furthermore, when the calling number identification presentation of the incoming call is provided, the calling party can be identified not only from the name and the reference numeral, but also from the portrait by intuition. This enables the user-to identify the calling party quickly and correctly. This offers an advantage of being able to implement the telephone to which the user can respond quickly without making a mistake.

EMBODIMENT 2

Although the foregoing embodiment 1 moves, when the desired portrait has been completed and the memory key "Mem" of the input device 5 is depressed, the name, telephone number and portrait element numbers, which are stored in the temporary memory 7C, to the memory table 7A to be stored in sequence as one of the entries in the memory dialing table with an entry number, this is not essential.

For, example, in the present embodiment 2, instead of the portrait element numbers stored in the memory table 7A as shown in FIG. 3, the composite image data of the portrait stored in the temporary memory 7C is directly stored in the memory 7A.

According to the present embodiment 2, although the amount of data increases, the composite image data of the portrait as shown in FIG. 8 is stored as it is. As a result, the present embodiment 2 provides an advantage of being able to implement the telephone that does not require the portrait montage processing in the retrieval, and can reduce the load of the controller 4.

EMBODIMENT 3

Figures 13, 14:
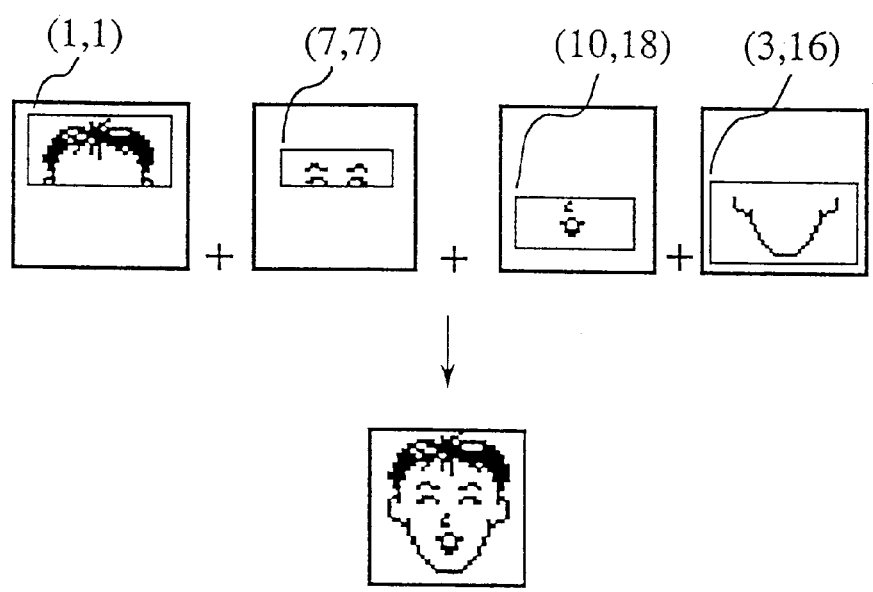
FIG. 13 is a table representing coordinates of locations of the portrait element image data in the embodiment 3.
FIG. 14 is a schematic illustration showing a portrait generated by combining the portrait elements in accordance with their X-Y coordinates in the embodiment 3.

In the present embodiment 3, the portrait element image data 7B occupy smaller areas than the composite image as shown in FIG. 12, and a coordinate table 7D as shown in FIG. 13 is made in the memory 7. The X and Y coordinates in the coordinate table 7D as shown in FIG. 13 are those in the composite portrait when combining into it the portrait element image data as shown in FIG. 12.

The locations of the portrait element image data in the composite portrait are determined in accordance with the X and Y coordinates in the coordinate table 7D of FIG. 13, and the remaining portion is considered to be consisting of white pixels. Thus, the composite portrait is formed by combining the portrait elements as in the foregoing embodiment 1.

According to the present embodiment 3, the portrait elements are made smaller in areas than the area of the actual composite image, and are combined into the portrait. This offers an advantage of being able to implement the telephone that can reduce the data amount of the portrait element image data 7B.

EMBODIMENT 4

The foregoing embodiment 1 is arranged such that it selects only one set of hair style, eyes, mouth and facial contour from among various portrait elements, and displays them on the display unit 6 as shown in FIG. 8.

Figures 15, 16:
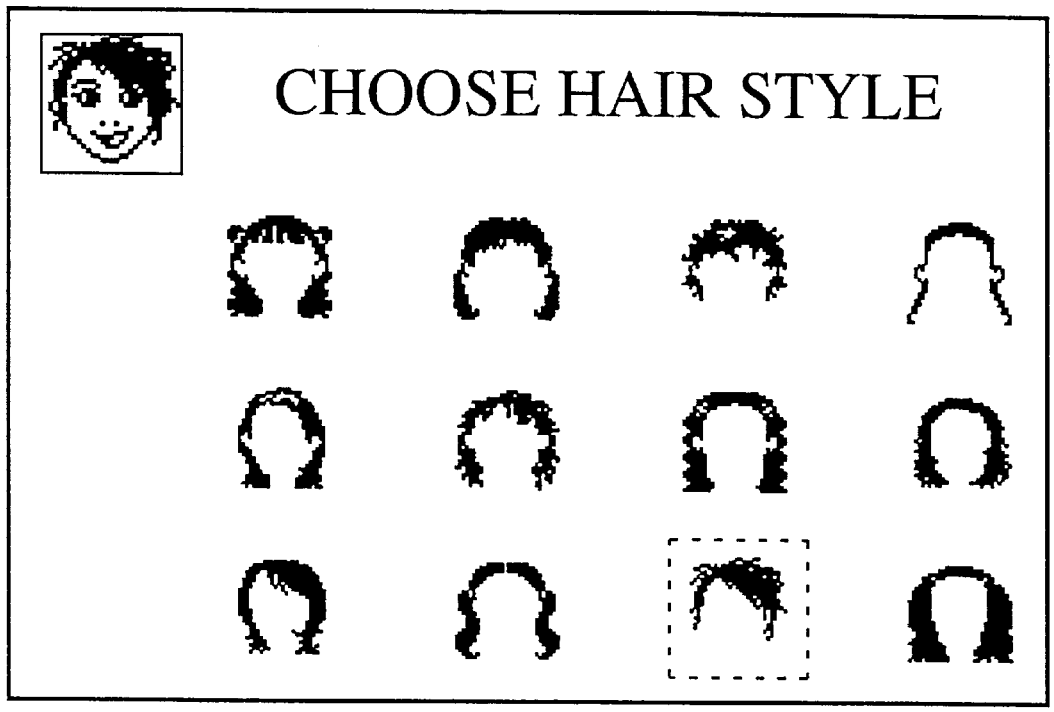
FIG. 15 is a schematic illustration showing, as an example of the portrait elements, a list of hair styles displayed on the display unit in an embodiment 4 of the telephone in accordance with the present invention.
FIG. 16 is a schematic illustration showing portrait element image data of subdivided elements of the hair style in an embodiment 5 of the telephone in accordance with the present invention.

In the present embodiment 4, in place of the picture shown in FIG. 8 displayed during the selection of the portrait elements, a plurality of portrait elements are displayed on the display unit 6 at the same time for each type of the hair style, eyes, mouth and facial contour as shown in FIG. 15, so that a listing of the hair styles, eyes, mouths or facial contours can be watched. The user selects one of them with the scroll key "∇∆" of the input device 5, and makes a decision with the memory key "Mem".

According to the present embodiment 4, since the user can select the portrait elements by sequentially scanning the listings of the hair styles, eyes, mouths and facial contours each displayed on the display unit 6, it has an advantage of being able to implement the telephone that can facilitate the selection of the individual portrait elements.

EMBODIMENT 5

In the portrait, the hair style, for example, can evoke very different image depending on a style near the shoulders even if the forelock is the same.

In view of this, the present embodiment 5 subdivides the portrait element image data of the hair style as shown in FIG. 16, and stores the subdivisions as the portrait element image data 7B. Besides, a subdivided portrait element memory table 7E is added which represents the combination of the subdivided portrait element image data as shown in FIG. 17. Then, the portrait element image of the hair style is generated as shown in FIG. 18 by combining the subdivided portrait element image data in accordance with the subdivided portrait element memory table 7E as shown in FIG. 17. This makes possible to reduce the memory capacity of the portrait element image data of the hair styles as shown in FIG. 16.

In the present embodiment 5, the portrait montage portion 3 shown in FIG. 1A includes a portrait element generating portion 3a for combining, into a hair style portrait element, fundamental components consisting of the forelock with subdivided feature components consisting of locks near the shoulders. In addition, the controller 4 includes the subdivided portrait element recording means 4a for recording, in the subdivided portrait element memory table 7E, for each portrait element, the fundamental components and subdivided feature components which are combined into the portrait element by the portrait element generating portion 3a.

The portrait element generating portion 3a combines, into a portrait representative of a called party, the fundamental components and the subdivided feature components the subdivided portrait element recording means 4a stores in the subdivided portrait element memory table 7E in terms of respective portrait elements such as the hair style, eyes, mouth and facial contour. The display unit 6 displays the fundamental components and subdivided feature components the portrait element generating portion 3a combines into the portrait elements.

The subdivision of the portrait element image data can be applied not only to the hair style, but also to the other portrait element image data such as the eyes, mouth and the facial contour.

According to the embodiment 5, subdividing the portrait element image data used for generating the portrait can reduce the capacity of the memory for storing them. This offers an advantage of being able to implement the telephone that can employ a small capacity memory as the memory 7.

EMBODIMENT 6

The present embodiment 6 reduces the amount of the portrait element image data by utilizing the symmetry of the facial contour or nose with respect to a vertical line. (A portrait element which is symmetric with respect to a horizontal line, if there is any, can also be handled).

In the present embodiment 6, the portrait montage portion 3 as shown in FIG. 1A includes a symmetry using portrait element generating portion 3b that generates a second half of the portrait element, which is symmetrical with a first half with respect to a vertical line or horizontal line, and that combines into a portrait element the first half and the second half. Then, the portrait montage portion 3 combines, into the portrait of a called party, the portrait elements the symmetry using portrait element generating portion 3b generates with other portrait elements.

FIG. 19 shows an example of the facial contour. Only its left half is stored as the portrait element image data 7B. The symmetry using portrait element generating portion 3b generates its right half from the left half of the facial contour using the symmetry with respect to the vertical line, and combines them into the portrait element image data.

Thus, the present embodiment 6 can reduce the amount of the portrait element image data. This offers an advantage of being able to implement the telephone that can employ a small capacity memory as the memory for storing the portrait elements.

EMBODIMENT 7

Figures 20, 21:
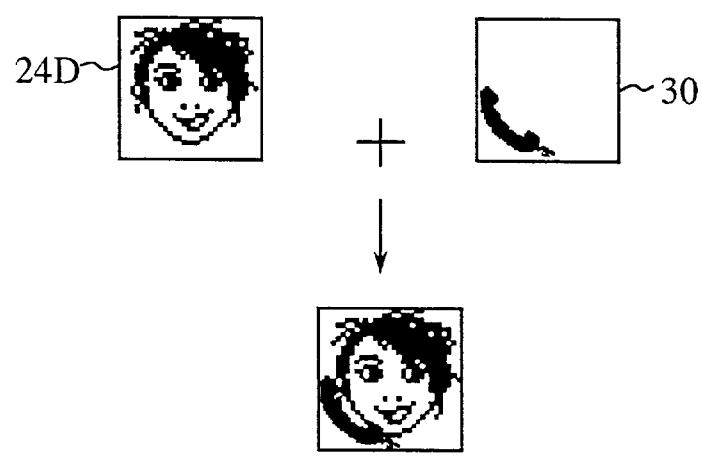
FIG. 20 is a schematic illustration showing portrait element image data used in an embodiment 7 of the telephone in accordance with the present invention.
FIG. 21 is a schematic illustration showing a portrait displayed on the display unit in an embodiment 8 of the telephone in accordance with the present invention.

In the present embodiment 7, motion images representative of movement as shown in FIG. 20 are stored as the portrait element image data 7B. When a call shifts into a conversation stage, the motion images are switched and combined to be displayed on the display unit 6. This offers an advantage of being able to implement the telephone that can provide movement in the portrait and increase sense of realism.

EMBODIMENT 8

As shown in FIG. 21, the present embodiment 8 combines an image 30 with the image 24D in the ringing or talking picture on the display unit 6 as shown in FIG. 10 or 11 of the foregoing embodiment 1 or 2. This can further increase the sense of realism during the ringing or talking.

EMBODIMENT 9

The present embodiment 9 is provided with a pointing device such as a touch panel and mouse in addition to the input device 5 of the embodiment 1 or 2, thereby enabling a user to input the portrait element image data by handwriting. This make it possible for the user to draw a desired portrait by handwriting, and input it. This function can also be applied to a composite portrait, achieving a similar effect.

EMBODIMENT 10

The present embodiment 10 is provided with an interface for connecting a personal computer or a digital camera with the embodiment 1 or 2 of the telephone so that the portrait element image data is transferred and stored in the telephone. This enables a user to generate an original portrait.

What is claimed is:

1. A method for registering automatic dialing telephone numbers in a memory of a telephone device, whereby said telephone numbers are automatically dialed by said device upon retrieval from said memory, comprising the steps of:

inputting into said device a name and a telephone number of an individual who is desired to be called by automatic dialing;

initializing a set of portrait element numbers defining a composite portrait to initial numbers, each portrait element number corresponding to a stored portrait element;

displaying on a display of said device a composite portrait made up of portrait elements corresponding to said initial portrait element numbers, by retrieving stored portrait elements corresponding to said portrait element numbers;

modifying individual portrait elements of said displayed composite portrait by incrementing or decrementing individual portrait element numbers, and displaying a new composite portrait corresponding to the modified individual portrait element after each individual portrait element modification; and storing in said memory at a particular address a set of portrait element numbers corresponding to a desired composite portrait as displayed on said display, along with said inputted name and telephone number.

2. The method of claim 1, wherein the step of modifying comprises the steps of individually modifying portrait elements corresponding to hair style.

3. The method of claim 1, wherein the step of modifying comprises the steps of individually modifying portrait elements corresponding to nose characteristics.

4. The method of claim 1, wherein the step of modifying comprises the steps of individually modifying portrait elements corresponding to eye characteristics.

5. The method of claim 1, wherein the step of modifying comprises the steps of individually modifying portrait elements corresponding to mouth characteristics.

6. The method of claim 1, wherein the step of modifying comprises the steps of individually modifying portrait elements corresponding to facial contour characteristics.

7. The method of claim 1, wherein said telephone device is a mobile radio telephone.

8. The method of claim 1, wherein the step of displaying further comprises the step of displaying an individual portrait element along with its associated portrait element number.

9. A method of automatically dialing from a telephone device the telephone number of an individual desired to be called, comprising the steps of:

retrieving from an initial address location of a memory of said telephone device, in response to the actuation of a call key on said device, a stored set of composite portrait element numbers each corresponding to a stored composite portrait element;

retrieving stored portrait elements corresponding to said retrieved portrait element numbers;

displaying on a display of said telephone device a composite portrait made up of said retrieved portrait elements;

retrieving from a subsequent address location of said memory in response to the actuation of a scroll key on said device a second stored set of composite portrait element numbers each corresponding to a stored composite portrait element, and repeating said step of retrieving stored portrait elements and said step of displaying in conjunction with said subsequent stored set of composite portrait elements; and automatically dialing a telephone number associated with a displayed composite portrait in response to the actuation of a dial key on said telephone device.

10. The method of claim 9, wherein the steps of retrieving from address location of said memory of said telephone device further comprises the step of retrieving a stored name of said individual, and said step of displaying further comprises the step of displaying said retrieved name together with said composite portrait.

11. The method of claim 9, wherein the steps of retrieving from address location of said memory of said telephone device further comprises the step of retrieving a stored telephone number of said individual, and said step of displaying further comprises the step of displaying said retrieved telephone number together with said composite portrait.

12. The method of claim 9, wherein the steps of retrieving from address location of said memory of said telephone device further comprises the step of retrieving a stored name and telephone number of said individual, and said step of displaying further comprises the step of displaying said retrieved name and telephone number together with said composite portrait.

13. The method of claim 9, wherein said step of automatically dialing further comprises the step of displaying together with said composite portrait an indication that said telephone number is being dialed.

14. The method of claim 9, wherein said step of automatically dialing further comprises the step of displaying together with said composite portrait an indication that the call associated with said dialed telephone number has been answered.

* * * * *